250-203.R AU 256 EX
12-4-73 XR 3,777,160

United States Patent [19]

Bernt

[11] 3,777,160

[45] Dec. 4, 1973

[54] OPTICAL RADIATION DETECTING APPARATUS

[75] Inventor: Paul Bernt, Erlangen, Germany

[73] Assignee: Siemens Aktiengesellschaft, Berlin and Munich, Germany

[22] Filed: Feb. 9, 1972

[21] Appl. No.: 224,717

[30] Foreign Application Priority Data

Mar. 22, 1971 Germany .................. P 21 13 712.2

[52] U.S. Cl. ........ 250/338, 250/203 R, 250/220 M, 250/370

[51] Int. Cl. .............................................. G01j 1/02

[58] Field of Search .................. 250/83.3 H, 203 R, 250/220 M

[56] References Cited

UNITED STATES PATENTS

| | | | |
|---|---|---|---|
| 2,953,688 | 9/1960 | Maxwell, Jr. et al. | 250/83.3 H |
| 2,997,594 | 8/1961 | MacNeille | 250/83.3 H X |
| 3,391,278 | 7/1968 | Duepner | 250/83.3 H |

*Primary Examiner*—Archie R. Borchelt
*Attorney*—Arthur E. Wilfond et al.

[57] ABSTRACT

The invention relates to an infrared position detector for determining two-dimensional position changes of the radiator. Several ring-sector formed radiation detectors are arranged in the air gap of an annular magnet and an image of the radiator is produced on one of the respective detectors by means of a reflector serving as discriminator, as well as an elliptical mirror optic. Semiconductor detectors are used as radiation detectors. The position detector is suitable for long-wave radiation and has a very small time constant.

14 Claims, 2 Drawing Figures

OPTICAL RADIATION DETECTING APPARATUS

Figure 1:
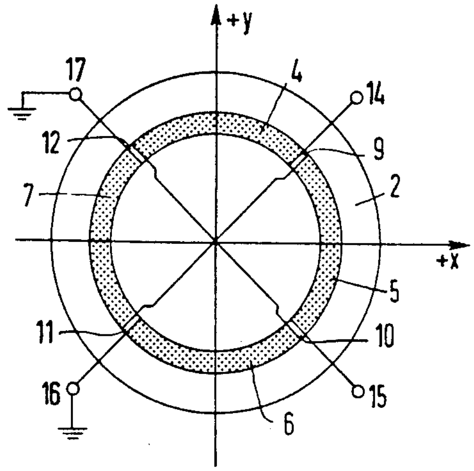

The invention relates to an apparatus for the detection of radiation having a variable point of origin. The apparatus contains several radiation responsive detector elements.

Radiation having wave lengths outside of the visible spectrum of more than about 2 to about 100 $\mu$m, particularly in the range of about 5 to 10 $\mu$m, may be detected with the aid of infrared position detectors. In their simplest form, position detectors comprise double detectors, arranged immediately adjacent to one another and electrically connected in pushpull. Such position detectors make it possible to determine the location change of a radiating object in the horizontal as well as in the vertical direction.

Such detectors, which are known as trackers or seekers, contain several photo resistances or active photo elements in the form of circle sectors which, together, form a disc. The individual sectors are respectively provided with electrical connecting terminals and form separate elements. The use of photo-resistances in such systems has the disadvantage that the wavelength is limited by the band of the frequency spectrum of the applied semiconductor. Such detectors are usable for comparatively long wavelengths only with special cooling provisions. For instance, when using indium antimonide semiconductors, these detectors may be used with a nitrogen cooling for wavelengths up to about 5.5 $\mu$m. With active semiconductor photoelements, these detectors are suitable for only comparatively short wavelengths. The wavelength of a silicon semiconductor is limited to about 1.1 $\mu$m, while germanium detectors are usable for wavelengths up to about 1.6 $\mu$m.

Thermal detectors, for instance thermistors, may also be used for this purpose. While these detectors may be operated without cooling and are suitable also for long wavelengths, they are nevertheless characterized frequently by a time constant of at least about $10^{-3}$ sec. which is too large for purposes of position determination. Beyond this point, all known position detectors for indicating a two-dimensional position change of the radiating object, the individual detectors of which are formed into a circular disc, possess the disadvantage that a more or less large region is formed in the middle of the disc about the center which does not provide any signal. Accordingly, an uninterrupted change in the output signal of the apparatus corresponding to a change of the radiating object from right to left or from above to below and vice-versa, is therefore impossible with these position detectors of the prior art.

It is an object of the invention to avoid this disadvantage of the known infrared location detectors for determining a two-dimensional change of the radiating object and, beyond, to provide a detector with a very small time constant.

Radiation detectors with a radiation responsive semiconductor body of indium antimonide are known in the form of individual detectors, which may be operated at room temperature with the use of a magnetic field. The operation of these detectors is based on the photoelectromagnetic effect. Accordingly, they are also known under the designation of "PEM-detector." These detectors are suitable for the use of indium antimonide, as a detector crystal for wavelengths up to about 7 $\mu$m and have a time constant of about $3.10^{-8}$ sec. Their detection response amounts to about $5.10^{8}$ cm $W^{-1}$sec $^{1/2}$. Although such detectors have a small time constant and a high resolution capacity, they require a strong magnetic field which may be produced at little cost only in a narrow air gap. The embodiment of the detectors in the known form as a large-surface disc is, therefore, impossible.

A thermo-magnetic detector is also known from the German Pat. No. 1,614,570, the usefulness of which depends on the optically induced Ettingshausen-Nernst effect and which, accordingly, is designated as an OEN detector. This detector comprises a two-phase semiconductor body with a semiconductor crystal of a III-V compound, particularly indium antimonide (InSb), which contains eutectic precipitations from a second crystalline phase consisting of material having a good electrical conductivity, particularly nickel antimonide (NiSb). The inclusions preferably have the form of needles which are formed parallel to one another and are vertically disposed relative to the irradiated crystal surface. In addition to the nickel antimonide mentioned, compounds of the type C BV are suitable as inclusions, in which C comprises an element of the group Fe, Co, Ni, Cr, Mn and BV, which is an element of the fifth group of the periodic system of the elements. Suitable compounds, for example, comprise iron antimonide FeSb, iron Arsenide FeAs, cobalt arsenide CoAs, chromium antimonide CrSb and chromium arsenide CrAs, as well as manganese antimonide MnSb. Additionally, these inclusions may consist of a vanadium-gallium compound, for instance, $V_2Ga_5$, or, too, of a gallium-vanadium antimony compound, such as $GaV_3Sb_5$. This OEN detector has a time constant of $10^{-4}$ sec and is suitable for infrared radiation of practically any wavelength. Its response capacity amounts to about $10^7$ cm $W^{-1}$ sec $^{-1/2}$. The detector may also be operated without cooling at room temperature. A surface enlargement so as to obtain a two-dimensionally effective location detector with a disc comprised of several sector-formed detector elements is, however, difficult, since, as in the case of the PEM detector, a magnetic field with sufficient field strength for the operation of the detector may be provided only at an inadmissably high expense.

The invention is based on the recognition that a detector for two-dimensional radiation detection may be provided with known favorable properties from these magnetic detectors, if it becomes possible to furnish radiation to one of such detector elements which is a function of changes in the location of the radiating object. As proposed by the invention, this object is attained in that several radiation responsive, ring sector formed semiconductor bodies are arranged as detector elements in the air gap of an annular type magnet which form a ring, and in that means are provided which cause an image of the radiator in dependence of the change of its point of origin to be formed on at least one of the ring sectors. The individual ring sectors are separated from each other at their ends by means of a thin electrically insulating layer, which may also comprise air, and are each provided with electrical terminals. The incoming radiation may in a simple manner be applied to at least one of the ring sectors over a discriminator and an optical mirror element, the reflection surfaces of which form a rotational conical section. PEM- as well as OEM-detectors may be provided as radiation detectors.

Since the radiating object does not appear on the surface of the semiconductor body as a point, but the image spot is rather greatly enlarged azimuthally, a part of the radiation that would impinge on the end of one of the semiconductor bodies or immediately before the end, will also impinge on the beginning of an adjacent semiconductor body. The ring sectors which are juxtaposed to one another along the ring circumference, preferably, may be connected electrically in opposition. This connection has the advantage that only a single transmission channel is required for the output signal in order to indicate the radiation deviation in one dimension. When the position of the radiating object has changed vertically with respect to the optical axis, which is identical with the rotational axis of the annular magnet, the image of the object will also change from the surface of one of the semiconductor bodies to that of the semiconductor body disposed in juxtaposition thereto. A dead zone, during the changeover of the output signal of the apparatus from the positive to the negative direction and vice-versa cannot occur in the proposed arrangement since the radius of curvature of the apex of the discriminator may be made smaller than the diameter of the image of the radiator produced by a predisposed objective. The radius of the image is determined by a diffraction disc as generated by the input pupil through rays which impinge on the objective in parallel.

A cone may be used as a discriminator, the rotational axis of which is identical with the optical axis and the apex of which is pointed toward the incoming radiation. The radiation is at first reflected by the cone and then by the optical mirror, the surface of which has the form of an ellipsoid. The sum of one of the focal points of the generating ellipse forms a focal ring on the ring sector and its second focus lies on the apex of the cone. Similarly, the sum of the second focal points in the vicinity of the apex of the discriminator, also forms a focal ring in a special embodiment of the proposed apparatus which is disposed vertically and concentrically with respect to the optical axis. The discriminator and the optical mirror preferably may be dimensioned such that the ratio of the diameter of the focal ring in the vicinity of the apex of the discriminator to the diameter of the semiconductor ring amounts to about 1:10. The focal ring in the vicinity of the apex of the discriminator may be disposed on the surface of the discriminator as well as at a predetermined distance therefrom.

A discriminator and an optical mirror are also suitable for forming an image of the radiation on the semiconductor ring, the reflecting surfaces of both of which have the form of a paraboloid. Moreover, the reflecting surface of the discriminator may have the form of a hyperboloid and that of the optical mirror may have the form of an ellipsoid. In these cases, the generating elements of the discriminator and the optical mirror comprise confocal conical sections, so that the focal ring disposed on the surface of the semiconductor body forms an image on the smaller focal ring in the vicinity of the apex of the discriminator by means of the optical mirror.

Figure 2:
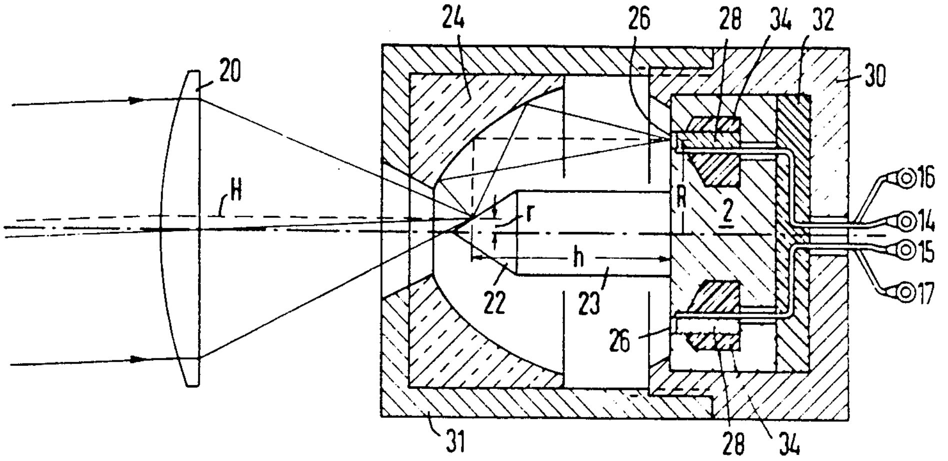

With these and other objects in view, which will become apparent in the following detailed description, the present invention will be clearly understood in connection with the accompanying drawings, in which:

FIG. 1 shows schematically the arrangement of ring formed radiation detectors arranged within an annular magnet, and FIG. 2 shows in cross section a view of a radiation detector in accordance with the invention.

In FIG. 1, four ring-sector formed radiation detector elements 4 to 7 are shown arranged in the air gap of an annular magnet 2 of a customary design. These ring sectors are thus subject to a radial magnetic field. Thin electrically insulating intervening layers 9 to 12 are arranged intermediate the ends of the individual sectors which, for the purposes of clarity, have been illustrated somewhat enlarged. These layers 9 to 12, together with semiconductor bodies 4 to 7, are arranged so as to comprise a ring. The ring sectors which are disposed in juxtaposition along the circumference of the ring are electrically connected in opposition. Thus, the connecting lead at one end of the semiconductor body 4, receives a positive or negative signal for a deviation in a positive or negative Y-direction which may be taken off at the output terminal 14. Similarly, the semiconductor bodies 5 and 7 are electrically connected in opposition so that a signal is formed at the connecting lead of the semiconductor 5 which may be taken off at the output terminal 15, and which, in accordance with the deviation of the arriving radiation in a positive or negative X-direction, has positive or negative polarity. The respective ends of semiconductor bodies 6 and 7 are at null potential as provided by terminals 16 or 17. The polarity signs of the two output signals at the terminals 14 and 15, accordingly, are a measure for the direction of the associated lateral deviation of the radiator from the optical axis. The output signals at terminals 14 and 15 may be used as reference magnitudes for a follow-up control. The follow-up control arrangement effects a rotation of the adjustment knob in correspondence to the deviation of the radiating object in the X and/or Y direction until the two signals show a null value. The degree of this rotation then becomes a measure for the angular deviation of the radiator (not shown in the drawing), vis-a-vis the optical axis before the follow-up control.

Not only is it possible to determine the direction of a change in position of a radiating object, but the magnitude of this deviation may be determined by the proposed system as well.

As shown in FIG. 2, radiation originating from an object (not shown), and indicated by arrows, is applied over an objective which is indicated as a lense at 20, but may also be an optical mirror, to a discriminator 22 which has a reflection surface in the form of a cone and the apex of which lies on the optical axis shown in dash-dot lines. The discriminator cone is connected by means of a pedestal to the annular magnet 2. The radiation is reflected from discriminator 22 and, after a further reflection on the surface of a mirror optic 24, reaches the surface of a semiconductor ring 26 formed of ring sectors, comprised of individual electrically insulated detectors 4 to 7, in accordance with FIG. 1, which are electrically insulated from one another. These detectors are arranged on a ring-formed carrier 28 in the air gap of the magnet 2 which may comprise an annular gap magnet as used in loudspeakers. The carrier 28 consists of electrically insulating material, preferably ceramic. The electrical leads together with the terminals 14 and 15 extend through a corresponding bore in the base of the magnet 2 and through an aperture in the housing 30 of the magnet 2. The intermediate spaces 32 and 34 formed in the housing 30 and in magnet 2 may suitably be filled with cast resin. The mirror optic 24, the reflecting surface of which in this embodiment comprises an ellipsoid, is arranged within a hood 31 threaded onto the magnet housing 30, provided with a corresponding aperture for the incoming radiation. The two connector terminals 16 and 17 are also shown arranged on the base of the housing 30 which, in the associated electronic circuit for the received signals, may be at null potential.

The generating ellipse of the mirror optic 24 is determined through the position of one of its focal points at a distance R from the optical axis on the surface of the detector ring 26 and of its other focal point which may be situated at the apex of cone 22. The sum of the focal points on the detector ring 26, forms a focal circle thereon with the radius R. The large main axis of the ellipse may preferably equal the sum of radius R of the focal circle and the distance h of the focus at the apex of the cone 23 from the plane of this focal circle. Thus, the main ray H which arrives parallel to the axis, impinges vertically with respect to the detector ring 26, as is shown in dashed lines in the Figure.

The form of the discriminator 22 in connection with the mirror optic 24 may suitably be made such that an image of the focal ring which is formed on the surface of the semiconductor ring 26, is generated by the mirror optic 24 in the vicinity of the apex of the discriminator 22. The optimal image precision of the reproduction of the radiator in the plane at a distance h from the semiconductor ring surface 26 is maintained for a predetermined angle between the optical axis and the direction of the incoming radiation. It is thus also possible to receive rays, the impingement direction of which deviates considerably from the optical axis.

The focal ring shown in FIG. 2, with a radius *r*, when used with a cone 22 as the discriminator, may be preferably disposed on the cone's conical surface. The ratio between the radius R of the focal ring on the surface of the semiconductor 26 to radius *r* of the focal ring on the cone's surface may preferably approximate 10:1.

The focal ring will not lie on the reflection surface when a parabola or hyperbola is used as generatrix for the reflection surfaces of the discriminator.

While I have disclosed a specific embodiment of the present invention, it is to be understood that this embodiment is given by example only and not in a limiting sense, the scope of the present invention being determined be the objects and the claims.

I claim:

1. In an apparatus for detecting two dimensional radiation, comprising a magnet having an annular gap, radiation detecting means in said gap adapted to detect position deviation from the origin of such radiation in one dimention, said detecting means including a ring having cooperative radiation responsive sectors of semiconductor elements juxtaposed to one another, means for receiving and transducing the output of an electromagnetic energy radiator to said apparatus, and means for producing an image of an electromagnetic energy radiator as a function of a change in position of origin thereof on at least one of said semiconductor elements.

2. Apparatus according to claim 1, wherein said semiconductor elements are responsive to a photoelectromagnetic effect.

3. Apparatus according to claim 1, wherein said semiconductor elements are comprised of a semiconductor material responsive to an optically induced Ettingshausen-Nernst effect.

4. Apparatus according to claim 3, wherein the semiconductor elements consist of a semiconductor material, the crystal of which contains eutectic precipitations of a second electrically conducting crystalline phase disposed in parallel to one another and vertically to the irradiated surface of said semiconductor elements.

5. Apparatus according to claim 4, wherein said semiconductor elements consist of indium antimonide (InSb) and said precipitations consist of nickel antimonide (NiSb).

6. Apparatus according to claim 1, wherein said semiconductor elements comprise four in number, means for electrically insulating said elements from one another, further including means for connecting those of said elements disposed in juxtaposition in electrical opposition, and means for deriving an output signal from said detector elements indicative of a change in the angle of the received radiation relative to the optical axis of the apparatus.

7. Apparatus according to claim 1, wherein said receiving and transducing means comprise a radiation collector, a discriminator, a mirror optic and said detector ring, said discriminator and mirror each having reflecting surfaces forming rotational conical sections.

8. Apparatus according to claim 7, wherein the reflecting surface of said discriminator comprises a cone shaped shell and that of said mirror optic comprises an ellipsoid.

9. Apparatus according to claim 8, wherein the large main axis of the ellipse generating the reflection surface of said mirror optic equals the sum of the distance R of one of its focal points on the surface of said detector ring from the center of said ring and of the distance h of its second focal point on the apex of said discriminator cone from the plane of the irradiated surface of said detector ring.

10. Apparatus according to claim 9, wherein said discriminator and said mirror optic comprise means for reproducing adjacent the apex of said discriminator the focal circle consisting of the sum of the focal points on the surface of said detector ring.

11. Apparatus according to claim 10, wherein the distance r of the focal point adjacent the apex of said discriminator from the optical axis substantially equals 1/10 of the distance R of the focal point on the surface of said detector ring from the optical axis.

12. Apparatus according to claim 7, wherein the reflection surface of said discriminator has the form of a hyperboloid and the reflection surface of said mirror optic has the form of an ellipsoid which is confocal therewith.

13. Apparatus according to claim 7, wherein the reflection surfaces of said discriminator and of said mirror optic, respectively, have the form of a paraboloid.

14. Apparatus according to claim 1, wherein said semiconductor elements are comprised of a material which is responsive to an electromagnetic effect.

* * * * *